April 5, 1938.                J. C. WASSER                2,113,204
                      MEANS FOR REPAIRING GAS LINES
                           Filed June 30, 1937
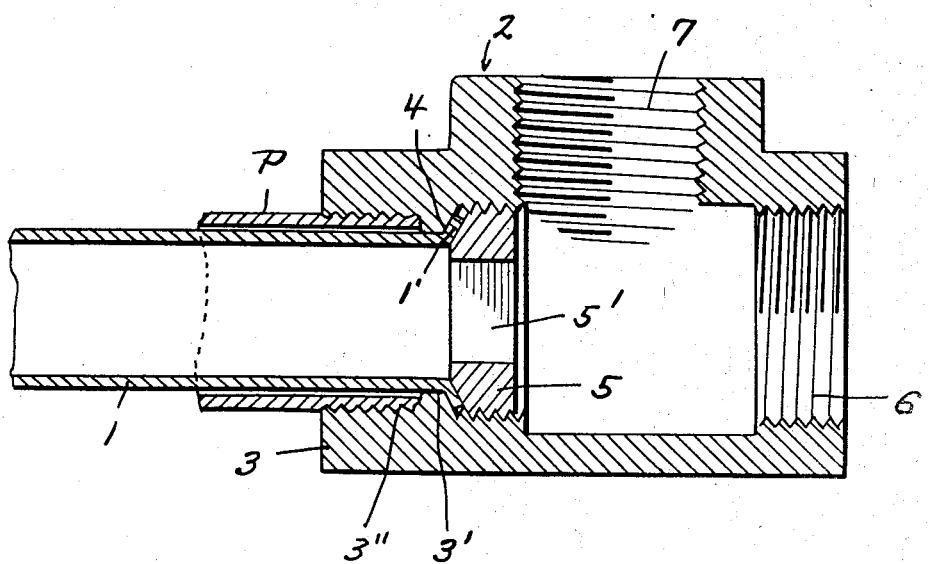
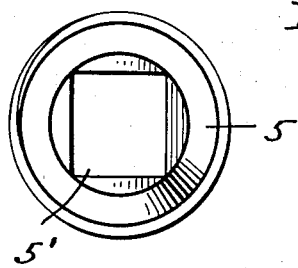
Inventor
Joseph Charles Wasser
By *Clarence A. O'Brien*
   *Hyman Berman*
                                                    Attorneys Patented Apr. 5, 1938

2,113,204

UNITED STATES PATENT OFFICE 2,113,204

MEANS FOR REPAIRING GAS LINES

Joseph Charles Wasser, Caseyville, Ill.

Application June 30, 1937, Serial No. 151,236

1 Claim. (Cl. 138—98)

This invention relates to means for repairing gas lines leading from a main into a building, the general object of the invention being to render it unnecessary to dig up the entire line or to remove the old pipes.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a sectional view showing the parts used in carrying out the invention.

Figure 2 is a view of the clamping plug.

When a leak occurs in the pipe line leading from the gas main into a building due to the pipes being partly destroyed by rust or in any other way, it is necessary to dig up all the pipes and replace them by new pipes. It is the object of my invention to make it unnecessary to dig up all the pipes but simply to dig a hole at the gas main and to use a tube of copper or the like which is passed through the line leading from the main and attached to a special fitting or T which replaces the regular T inside the building.

The tube is shown in Figure 1 at 1 and the improved T or fitting at 2. This T has the end 3 formed with an internal outwardly flaring shoulder 4 for receiving the flare 1' of the tube, this end 1' being held on the shoulder by a plug 5 which is threaded in the enlarged inner end of the bore of the part 3 and has a beveled part which clamps the end 1' on the shoulder. This plug is formed with a square opening 5' for receiving a wrench so that it can be turned to put it in place or remove it. The plug is put in place and the wrench works through a large threaded opening 6 in the fitting 2 and this opening is adapted to be closed by a locking plug. The third threaded opening 7 of the fitting is, of course, adapted to receive the pipe leading to the meter or other part of the house servicing line. As will be seen the part 3 has its outer part threaded to receive the old pipe P. This outer portion of the bore 3'' is of less diameter than the inner end of the bore and a reduced unthreaded portion 3' is located between the two threaded portions of the bore. A shoulder 4 is formed on the inner end of this part 3' and this plain part 3' snugly surrounds the inner end of the tube 1, as shown in Figure 1.

In using the invention a hole is dug at the main and the tube 1 is forced through the line leading to the house and it is pushed through the fitting 2 which has been attached to the pipe P. The flare 1' is then formed on the tube and then the tube is pulled back until this flare engages the shoulder 4 after which the plug 5 is put in place to clamp the flaring end 1' against the shoulder. The plain part 3' holds the tube in spaced relation to the pipe P.

Thus the tube will carry the gas from the main into the house and will keep the gas from leaking through the old pipes which remain in place and through which the tube passes. With this invention a leaky line can be easily and quickly repaired and at small expense compared with the old method of digging up the old pipes and replacing them by new ones.

It is thought from the foregoing description that the advantages and novel features of the invention will be readily apparent.

It is to be understood that changes may be made in the construction and in the combination and arrangement of the several parts, provided that such changes fall within the scope of the appended claim.

Having described the invention what is claimed as new is:—

Means for repairing a fluid line which includes a pipe, comprising a T having one end provided with a bore which includes an enlarged and threaded inner end, a threaded outer portion for receiving one end of the pipe and an intermediate plain portion of smaller diameter than the outer portion and a flaring shoulder at the junction of said intermediate plain part with the enlarged inner end part, a tube passing through the pipe and through the intermediate portion with its inner end flared to engage the shoulder, a threaded plug threaded in the inner end of the bore and clamping the flared part of the tube between itself and the shoulder, the opposite end of the T having a threaded bore for receiving a threaded plug, said last-mentioned bore being larger than the first mentioned plug to permit the plug to pass through the same.

JOSEPH CHARLES WASSER.